(12) United States Patent
Knapp et al.

(10) Patent No.: US 9,286,331 B2
(45) Date of Patent: *Mar. 15, 2016

(54) VERIFYING AND BALANCING SERVER RESOURCES VIA STORED USAGE DATA

(71) Applicant: Go Daddy Operating Company, LLC, Scottsdale, AZ (US)

(72) Inventors: Adam Knapp, Mesa, AZ (US); Brent Strange, Gilbert, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/928,664

(22) Filed: Jun. 27, 2013

(65) Prior Publication Data

US 2013/0290284 A1 Oct. 31, 2013

Related U.S. Application Data

(63) Continuation of application No. 12/774,726, filed on May 6, 2010, now Pat. No. 8,719,223.

(51) Int. Cl.
*G06F 17/30* (2006.01)
(52) U.S. Cl.
CPC ........ *G06F 17/30303* (2013.01); *G06F 17/302* (2013.01); *G06F 17/30212* (2013.01)
(58) Field of Classification Search
None
See application file for complete search history.

(56) References Cited

U.S. PATENT DOCUMENTS

| 5,426,594 A | 6/1995 | Wright et al. |
| 5,771,354 A | 6/1998 | Crawford |
| 5,774,660 A | 6/1998 | Brendel et al. |
| 5,870,550 A | 2/1999 | Wesinger et al. |
| 5,872,848 A | 2/1999 | Romney et al. |
| 5,887,133 A | 3/1999 | Brown et al. |
| 5,901,228 A | 5/1999 | Crawford |
| 6,003,030 A | 12/1999 | Kenner et al. |
| 6,012,066 A | 1/2000 | Discount et al. |
| 6,044,205 A | 3/2000 | Reed et al. |
| 6,108,703 A | 8/2000 | Leighton et al. |
| 6,151,631 A | 11/2000 | Ansell et al. |

(Continued)

FOREIGN PATENT DOCUMENTS

WO 2007052285 5/2007

OTHER PUBLICATIONS

Mar. 14, 2014 Notice of Allowance in related U.S. Appl. No. 12/774,726.

(Continued)

*Primary Examiner* — Rehana Perveen
*Assistant Examiner* — Raheem Hoffler
(74) *Attorney, Agent, or Firm* — Quarles & Brady LLP (57) ABSTRACT

Systems and methods of the present invention provide for a user uploading a file and a customized metadata about the file to a file storage system. This information may be forwarded to an application, possibly an API, which may divide the file into a plurality of file chunks if the file is greater than a predetermined file size. One or more tracker servers may check a database to locate optimal file locations for the file or file chunks to be stored within the file storage system. These optimal locations may be returned from the tracker servers to the application/API which may perform an HTTP request to write the file to the file storage system. The file write may be validated and finalized, and the successful write may be displayed to the user on a user interface on a client.

20 Claims, 4 Drawing Sheets

(56) References Cited

U.S. PATENT DOCUMENTS

| | | |
|---|---|---|
| 6,263,447 B1 | 7/2001 | French et al. |
| 6,286,045 B1 | 9/2001 | Griffiths et al. |
| 6,308,275 B1 | 10/2001 | Vaswani et al. |
| 6,393,482 B1 | 5/2002 | Rai et al. |
| 6,400,722 B1 | 6/2002 | Chuah et al. |
| 6,411,943 B1 | 6/2002 | Crawford |
| 6,553,413 B1 | 4/2003 | Leighton et al. |
| 6,598,077 B2 | 7/2003 | Primak et al. |
| 6,625,643 B1 | 9/2003 | Colby et al. |
| 6,629,136 B1 | 9/2003 | Naidoo |
| 6,647,422 B2 | 11/2003 | Wesinger et al. |
| 6,654,804 B1 | 11/2003 | Fleming, III |
| 6,671,715 B1 | 12/2003 | Langseth et al. |
| 6,675,208 B1 | 1/2004 | Rai et al. |
| 6,757,740 B1 | 6/2004 | Parekh et al. |
| 6,789,103 B1 | 9/2004 | Kim et al. |
| 6,829,230 B1 | 12/2004 | Tiuri |
| 6,842,769 B1 | 1/2005 | Kim et al. |
| 6,868,444 B1 | 3/2005 | Kim et al. |
| 6,871,214 B2 | 3/2005 | Parsons et al. |
| 6,888,836 B1 | 5/2005 | Cherkasova |
| 6,996,609 B2 | 2/2006 | Hickman et al. |
| 7,007,080 B2 | 2/2006 | Wilson |
| 7,007,093 B2 | 2/2006 | Spicer et al. |
| 7,080,051 B1 | 7/2006 | Crawford |
| 7,111,072 B1 | 9/2006 | Matthews et al. |
| 7,139,840 B1 | 11/2006 | O'Toole |
| 7,149,892 B2 | 12/2006 | Freed et al. |
| 7,197,545 B1 | 3/2007 | Davie |
| 7,225,248 B1 | 5/2007 | Osburn, III |
| 7,233,978 B2 | 6/2007 | Overton et al. |
| 7,359,935 B1 | 4/2008 | Karipides et al. |
| 7,369,996 B2 | 5/2008 | Sladden |
| 7,373,500 B2 | 5/2008 | Ramelson et al. |
| 7,383,327 B1 | 6/2008 | Tormasov et al. |
| 7,386,880 B2 | 6/2008 | Wesinger et al. |
| 7,392,321 B1 | 6/2008 | Wolf et al. |
| 7,414,981 B2 | 8/2008 | Jaramillo et al. |
| 7,433,710 B2 | 10/2008 | Bodnar et al. |
| 7,454,457 B1 | 11/2008 | Lowery et al. |
| 7,483,929 B2 | 1/2009 | Kulkarni et al. |
| 7,487,546 B1 | 2/2009 | Szor |
| 7,506,010 B2 | 3/2009 | Kulkarni et al. |
| 7,590,073 B2 | 9/2009 | Beckmann et al. |
| 7,599,847 B2 | 10/2009 | Block et al. |
| 7,644,117 B2 | 1/2010 | Zimmerman et al. |
| 7,647,387 B2 | 1/2010 | Bellare et al. |
| 7,649,854 B2 | 1/2010 | Piper |
| 7,716,367 B1 | 5/2010 | Leighton et al. |
| 7,734,631 B2 | 6/2010 | Richardson et al. |
| 7,747,746 B2 | 6/2010 | Thayer et al. |
| 7,752,313 B2 | 7/2010 | Adelman et al. |
| 7,774,460 B2 | 8/2010 | Adelman et al. |
| 7,783,540 B2 | 8/2010 | Davis et al. |
| 7,804,982 B2 | 9/2010 | Howard et al. |
| 7,805,379 B1 | 9/2010 | Adkins, III et al. |
| 7,831,682 B2 | 11/2010 | Certain et al. |
| 7,840,637 B2 | 11/2010 | Adelman et al. |
| 7,873,709 B2 | 1/2011 | Lee et al. |
| 7,904,345 B2 | 3/2011 | Dworkin et al. |
| 7,933,996 B2 | 4/2011 | Rechterman |
| 7,941,510 B1 | 5/2011 | Tormasov et al. |
| 7,987,262 B2 | 7/2011 | Tung et al. |
| 8,024,456 B2 | 9/2011 | Adelman et al. |
| 8,024,578 B2 | 9/2011 | Geosimonian |
| 8,069,266 B2 | 11/2011 | Schwimer |
| 8,073,970 B2 | 12/2011 | Schwimer |
| 8,078,757 B2 | 12/2011 | Schwimer |
| 8,150,912 B2 | 4/2012 | Rechterman |
| 8,171,161 B2 | 5/2012 | Schwimer |
| 8,234,161 B1 | 7/2012 | Sazhin |
| 8,234,372 B2 | 7/2012 | Knapp et al. |
| 8,260,913 B2 | 9/2012 | Knapp et al. |
| 8,275,868 B2 | 9/2012 | Rechterman |
| 8,355,527 B2 | 1/2013 | Bladel et al. |
| 8,355,528 B2 | 1/2013 | Bladel et al. |
| 8,356,090 B2 | 1/2013 | Parsons et al. |
| 8,364,771 B2 | 1/2013 | Thayer et al. |
| 8,370,407 B1 | 2/2013 | Devarajan et al. |
| 8,370,940 B2 | 2/2013 | Holloway et al. |
| 2001/0001854 A1 | 5/2001 | Schena |
| 2001/0011304 A1 | 8/2001 | Wesinger et al. |
| 2001/0046227 A1 | 11/2001 | Matsuhira et al. |
| 2002/0035611 A1 | 3/2002 | Dooley |
| 2002/0042719 A1 | 4/2002 | Chauchard et al. |
| 2002/0073235 A1 | 6/2002 | Chen et al. |
| 2002/0087643 A1 | 7/2002 | Parsons et al. |
| 2002/0143564 A1 | 10/2002 | Webb et al. |
| 2002/0143664 A1 | 10/2002 | Webb |
| 2002/0147790 A1 | 10/2002 | Snow |
| 2002/0152224 A1 | 10/2002 | Roth et al. |
| 2002/0178381 A1 | 11/2002 | Lee et al. |
| 2003/0005287 A1 | 1/2003 | Wray et al. |
| 2003/0009594 A1 | 1/2003 | McElligott |
| 2003/0069953 A1 | 4/2003 | Bottom et al. |
| 2003/0069991 A1 | 4/2003 | Brescia |
| 2003/0078894 A1 | 4/2003 | Kon |
| 2003/0078962 A1 | 4/2003 | Fabbricatore et al. |
| 2003/0101278 A1 | 5/2003 | Garcia-Luna-Aceves et al. |
| 2003/0120502 A1 | 6/2003 | Robb et al. |
| 2003/0229900 A1 | 12/2003 | Reisman |
| 2004/0024861 A1* | 2/2004 | Coughlin ...................... 709/224 |
| 2004/0039906 A1 | 2/2004 | Oka et al. |
| 2004/0083306 A1 | 4/2004 | Gloe |
| 2004/0083307 A1 | 4/2004 | Uysal |
| 2004/0088422 A1 | 5/2004 | Flynn et al. |
| 2004/0133440 A1 | 7/2004 | Carolan et al. |
| 2004/0148229 A1 | 7/2004 | Maxwell |
| 2004/0167858 A1 | 8/2004 | Erickson |
| 2004/0186778 A1 | 9/2004 | Margiloff et al. |
| 2004/0210663 A1 | 10/2004 | Phillips et al. |
| 2004/0260807 A1 | 12/2004 | Glommen et al. |
| 2005/0015468 A1 | 1/2005 | Lim et al. |
| 2005/0022196 A1* | 1/2005 | Davis et al. ...................... 718/100 |
| 2005/0038658 A1 | 2/2005 | Sladden |
| 2005/0038814 A1 | 2/2005 | Iyengar et al. |
| 2005/0105513 A1 | 5/2005 | Sullivan et al. |
| 2005/0114541 A1 | 5/2005 | Ghetie et al. |
| 2005/0134896 A1 | 6/2005 | Koga |
| 2005/0228881 A1 | 10/2005 | Reasor et al. |
| 2005/0239447 A1 | 10/2005 | Holzman et al. |
| 2006/0047725 A1 | 3/2006 | Bramson |
| 2006/0100912 A1 | 5/2006 | Kumar et al. |
| 2006/0126201 A1 | 6/2006 | Jain |
| 2006/0129635 A1 | 6/2006 | Baccou et al. |
| 2006/0139312 A1 | 6/2006 | Sinclair, II et al. |
| 2006/0179083 A1 | 8/2006 | Kulkarni et al. |
| 2006/0193333 A1 | 8/2006 | Baughan et al. |
| 2006/0198322 A1 | 9/2006 | Hares |
| 2006/0200527 A1 | 9/2006 | Woods |
| 2006/0206547 A1 | 9/2006 | Kulkarni et al. |
| 2006/0236254 A1 | 10/2006 | Mateescu et al. |
| 2006/0245433 A1 | 11/2006 | Berg et al. |
| 2007/0021971 A1 | 1/2007 | McKinney et al. |
| 2007/0038755 A1 | 2/2007 | Sullivan et al. |
| 2007/0055647 A1 | 3/2007 | Mullins et al. |
| 2007/0061462 A1 | 3/2007 | Kim et al. |
| 2007/0061465 A1 | 3/2007 | Kim et al. |
| 2007/0094411 A1 | 4/2007 | Mullane et al. |
| 2007/0150363 A1 | 6/2007 | Patrawala |
| 2007/0153691 A1 | 7/2007 | Halpern |
| 2007/0174237 A1 | 7/2007 | Wilbrink et al. |
| 2007/0174635 A1 | 7/2007 | Jones |
| 2007/0180436 A1 | 8/2007 | Travostino et al. |
| 2007/0192493 A1 | 8/2007 | Manolache et al. |
| 2007/0198724 A1 | 8/2007 | Hawkinson et al. |
| 2007/0198946 A1 | 8/2007 | Viji et al. |
| 2007/0219875 A1 | 9/2007 | Toulotte |
| 2007/0225962 A1 | 9/2007 | Brunet et al. |
| 2007/0283005 A1 | 12/2007 | Beliles et al. |
| 2007/0291739 A1 | 12/2007 | Sullivan et al. |
| 2008/0005312 A1 | 1/2008 | Boss et al. |
| 2008/0010139 A1 | 1/2008 | Elmer et al. |
| 2008/0019359 A1 | 1/2008 | Droux et al. |

(56) References Cited

U.S. PATENT DOCUMENTS

| | | |
|---|---|---|
| 2008/0046340 A1 | 2/2008 | Brown |
| 2008/0052384 A1 | 2/2008 | Marl et al. |
| 2008/0059607 A1 | 3/2008 | Schneider |
| 2008/0071883 A1 | 3/2008 | Alterman |
| 2008/0115071 A1 | 5/2008 | Fair |
| 2008/0120617 A1 | 5/2008 | Keller et al. |
| 2008/0126232 A1 | 5/2008 | Lee |
| 2008/0133624 A1 | 6/2008 | Phillips et al. |
| 2008/0141237 A1 | 6/2008 | Elad et al. |
| 2008/0147856 A1 | 6/2008 | Lee et al. |
| 2008/0177994 A1 | 7/2008 | Mayer |
| 2008/0182561 A1 | 7/2008 | Kim et al. |
| 2008/0201410 A1 | 8/2008 | Adelman et al. |
| 2008/0201413 A1 | 8/2008 | Sullivan et al. |
| 2008/0201421 A1 | 8/2008 | Adelman et al. |
| 2008/0201466 A1 | 8/2008 | Adelman et al. |
| 2008/0201473 A1 | 8/2008 | Adelman et al. |
| 2008/0229430 A1 | 9/2008 | Kargman |
| 2008/0235289 A1 | 9/2008 | Carnes et al. |
| 2008/0243536 A1 | 10/2008 | Dworkin et al. |
| 2008/0243634 A1 | 10/2008 | Dworkin et al. |
| 2008/0256553 A1 | 10/2008 | Cullen |
| 2008/0270418 A1 | 10/2008 | Chen et al. |
| 2008/0282338 A1 | 11/2008 | Beer |
| 2008/0287094 A1 | 11/2008 | Keeler et al. |
| 2008/0288300 A1 | 11/2008 | Emling et al. |
| 2008/0294479 A1 | 11/2008 | Emling et al. |
| 2008/0294648 A1* | 11/2008 | Lin et al. .................... 707/10 |
| 2008/0294768 A1 | 11/2008 | Sampson et al. |
| 2009/0007229 A1 | 1/2009 | Stokes |
| 2009/0016522 A1 | 1/2009 | Torres et al. |
| 2009/0042537 A1 | 2/2009 | Gelbman et al. |
| 2009/0048712 A1 | 2/2009 | Rosenblum |
| 2009/0055506 A1 | 2/2009 | Hudson et al. |
| 2009/0094379 A1 | 4/2009 | Lu et al. |
| 2009/0132487 A1 | 5/2009 | Lev |
| 2009/0150527 A1 | 6/2009 | Tripathi et al. |
| 2009/0157882 A1 | 6/2009 | Kashyap |
| 2009/0248595 A1 | 10/2009 | Lu et al. |
| 2009/0254610 A1 | 10/2009 | Arthursson |
| 2009/0272799 A1 | 11/2009 | Skor et al. |
| 2009/0276771 A1 | 11/2009 | Nickolov et al. |
| 2009/0300407 A1 | 12/2009 | Kamath et al. |
| 2009/0313320 A1 | 12/2009 | Parsons et al. |
| 2009/0313321 A1 | 12/2009 | Parsons et al. |
| 2009/0313363 A1 | 12/2009 | Parsons et al. |
| 2009/0313364 A1 | 12/2009 | Parsons et al. |
| 2010/0027420 A1 | 2/2010 | Smith |
| 2010/0030791 A1 | 2/2010 | Iverson et al. |
| 2010/0036931 A1 | 2/2010 | Certain et al. |
| 2010/0042487 A1 | 2/2010 | Barazani |
| 2010/0106691 A1 | 4/2010 | Preslan et al. |
| 2010/0114739 A1 | 5/2010 | Johnston |
| 2010/0125473 A1 | 5/2010 | Tung et al. |
| 2010/0153848 A1 | 6/2010 | Saha |
| 2010/0191783 A1 | 7/2010 | Mason et al. |
| 2010/0306122 A1 | 12/2010 | Shaffer et al. |
| 2010/0306267 A1 | 12/2010 | Zamoff et al. |
| 2010/0332456 A1 | 12/2010 | Prahlad et al. |
| 2010/0332818 A1 | 12/2010 | Prahlad |
| 2010/0333116 A1 | 12/2010 | Prahlad et al. |
| 2011/0040980 A1 | 2/2011 | Kerr et al. |
| 2011/0055249 A1 | 3/2011 | Consuegra et al. |
| 2011/0080940 A1 | 4/2011 | Bocharov |
| 2011/0083037 A1 | 4/2011 | Bocharov |
| 2011/0087690 A1 | 4/2011 | Cairns |
| 2011/0093769 A1 | 4/2011 | Dunn et al. |
| 2011/0106802 A1 | 5/2011 | Pinkney et al. |
| 2011/0137865 A1 | 6/2011 | Shin et al. |
| 2011/0161291 A1 | 6/2011 | Taleck et al. |
| 2011/0185355 A1 | 7/2011 | Chawla |
| 2011/0238621 A1* | 9/2011 | Agrawal .................... 707/610 |
| 2011/0252071 A1 | 10/2011 | Cidon |
| 2011/0282988 A1 | 11/2011 | Wang et al. |
| 2012/0023090 A1 | 1/2012 | Holloway et al. |
| 2012/0114191 A1 | 5/2012 | Bladel et al. |
| 2012/0116896 A1 | 5/2012 | Holloway et al. |
| 2012/0117641 A1 | 5/2012 | Holloway et al. |
| 2012/0174196 A1 | 7/2012 | Bhogavilli et al. |

OTHER PUBLICATIONS

Jun. 12, 2012 Notice of Allowance in related U.S. Appl. No. 12/774,723.

QuackIT; "Cold Fusion Administration"; Oct. 14, 2007; QuackIT.com; pp. 1-3.

Cisco; "Configuring Virtual Interfaces"; May 2, 2005; excerpt from Cisco IOS Interface and Hardware Component Configuration Guide; pp. 1-12.

Cisco01; "Chapter 7: Configuring Switches"; Apr. 14, 2008; www.Cisco.com; pp. 1-9.

Microsoft01; "Static routing design considerations"; Jan. 21, 2005; www.microsoft.com; pp. 1-2.

Solaris03; "System Administration Guide: Solaris Containers—Resource Management and Solaris Zones"; Jan. 2005; Sun Microsystems Inc; pp. 1-334.

Microsoft looks ahead, Magazine, eWeek, Mar. 3, 2008, pp. 14-15.

Getting Started with Linux Shared Hosting, Dec. 7, 2006.

IBM Cloud Computing Version 1.0, Oct. 8, 2007.

About MogileFS http://www.danga.com/mogilefs/, May 10, 2010.

Peterson, cPanel User Guide and Tutorial, Packt Publishing, All, Mar. 2006.

Getting Started with Windows Shared Hosting, Version 2.1, Apr. 9, 2007.

Plesk 8.3 for Windows Administrator's Guide, SWsoft Holdings, Ltd, Revision 1.0, 2007, All Pages.

PHP-Nuke: Management and Programming, Revision 2.1, 2005, All Pages.

Advanced Linux Networking, Jun. 11, 2002, Addison Wesley Professional, pp. 456, 457.

Zenel, A General Purpose Proxy Filtering Mechanism Applied to the Mobile Environment, Wireless Network, vol. 5, Issue 5, Oct. 1999, pp. 391-409.

Zenel, A General Purpose Proxy Filtering Mechanism Applied to the Mobile Environment, 1997.

Zenel, A Proxy Based Filtering Mechanism for the Mobile Environment, Doctoral Thesis, Columbia University, 1998.

CertaintySolutions; "Understanding DNS: How to Register for, Configure, and Change DNS Service"; Sep. 2000; Certainty Solutions Inc; pp. 1-7.

Microsoft Computer Dictionary, 5th Edition, 2002, p. 383.

Huang et al.; Design of Privacy-Preserving Cloud Storage Framework; Grid and Cooperative Computing (GCC), 2010 9th International; Nov. 1-5, 2010; pp. 128-132.

* cited by examiner

VERIFYING AND BALANCING SERVER RESOURCES VIA STORED USAGE DATA

CROSS REFERENCE TO RELATED PATENT APPLICATIONS

This patent application is related to the following concurrently-filed patent applications:

U.S. patent application Ser. No. 12/774,723, "READING A FILE FROM A CLOUD STORAGE SOLUTION."

U.S. patent application Ser. No. 12/774,725, "WRITING A FILE TO A CLOUD STORAGE SOLUTION."

U.S. patent application Ser. No. 12/774,726, "CLOUD STORAGE SOLUTION FOR READING AND WRITING FILES."

The subject matter of all patent applications is commonly owned and assigned to Go Daddy Operating Company, LLC. All prior applications are incorporated herein in their entirety by reference.

FIELD OF THE INVENTION

The present inventions generally relate to the field of cloud storage and specifically to the field of reading and writing one or more files to a cloud storage solution.

SUMMARY OF THE INVENTION

The present inventions provide methods and systems for a user uploading a file and a customized metadata about the file to a file storage system. This information may be forwarded to an application, possibly an API, which may divide the file into a plurality of file chunks if the file is greater than a predetermined file size. One or more tracker servers may check a database to locate optimal file locations for the file or file chunks to be stored within the file storage system. These optimal locations may be returned from the tracker servers to the application/API which may perform an HTTP request to write the file to the file storage system. The file write may be validated and finalized, and the successful write may be displayed to the user on a user interface on a client.

The present inventions also provide methods and systems for a user requesting a file or a plurality of file chunks stored in a file storage system, and a customized metadata stored in data storage. One or more tracker servers may determine file locations in the file system, and the location of the customized metadata in the data storage. These locations may be returned to an application, possibly an API, which may determine one or more URLs for the file locations and perform an HTTP request to read the file or file chunks from the locations or URLs in the file system. The file or file chunks, along with the customized metadata, may then be returned and displayed to the user that requested them.

The above features and advantages of the present invention will be better understood from the following detailed description taken in conjunction with the accompanying drawings.

DETAILED DESCRIPTION

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

As Internet use has become more popular, "cloud computing" has become more predominant. Cloud computing may be used as an alternative to having local servers or personal devices handling users' applications. In general, cloud computing may indicate that function or storage comes from "the cloud." The cloud is often understood to mean a public network, possibly based on TCP/IP networks, specifically often assumed to be the Internet, so that function within the environment does not come from a specific identifiable device.

In storing files to the Internet, cloud storage may be used. Cloud storage may refer to a model of networked data storage where data may be stored on multiple physical or virtual servers, generally hosted by third parties, rather than being hosted on dedicated servers.

The architecture behind cloud computing may include a network of "cloud servers" interconnected as if in a grid running in parallel, sometimes using techniques of virtualization, to maximize computing power per computer and/or server. In general, cloud computing may represent a subset of grid computing that may include utility computing and other approaches to the use of shared computing resources.

Writing a File to a Cloud Storage Solution

Several different methods may be used to provide and manage the disclosed invention. The disclosed method steps may describe one non-limiting example of a happy path of writing a file from an application/API to a file system, both described herein.

Figure 1:
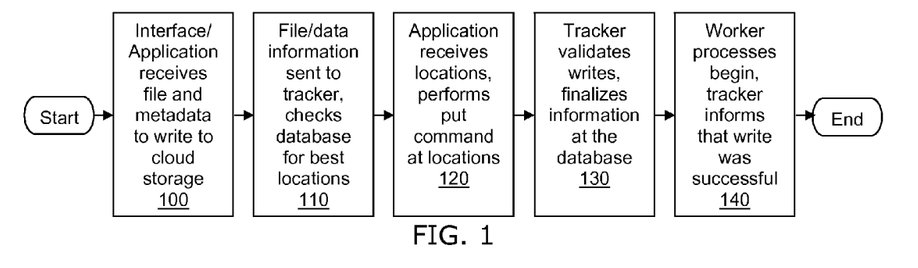
FIG. 1 is a flow diagram illustrating a possible embodiment of a method for writing a file to a cloud storage solution.
Figure 2:
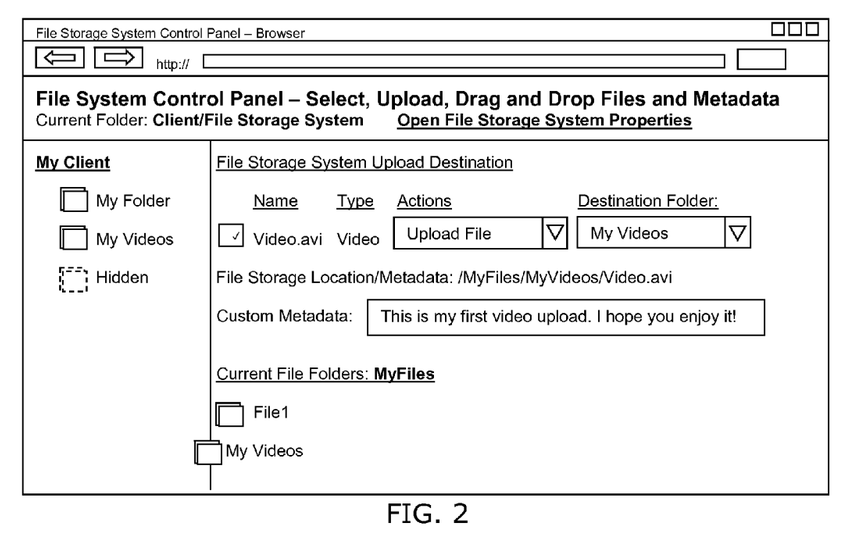
FIG. 2 illustrates a possible embodiment of an interface for writing a file to a cloud storage solution.
Figure 3:
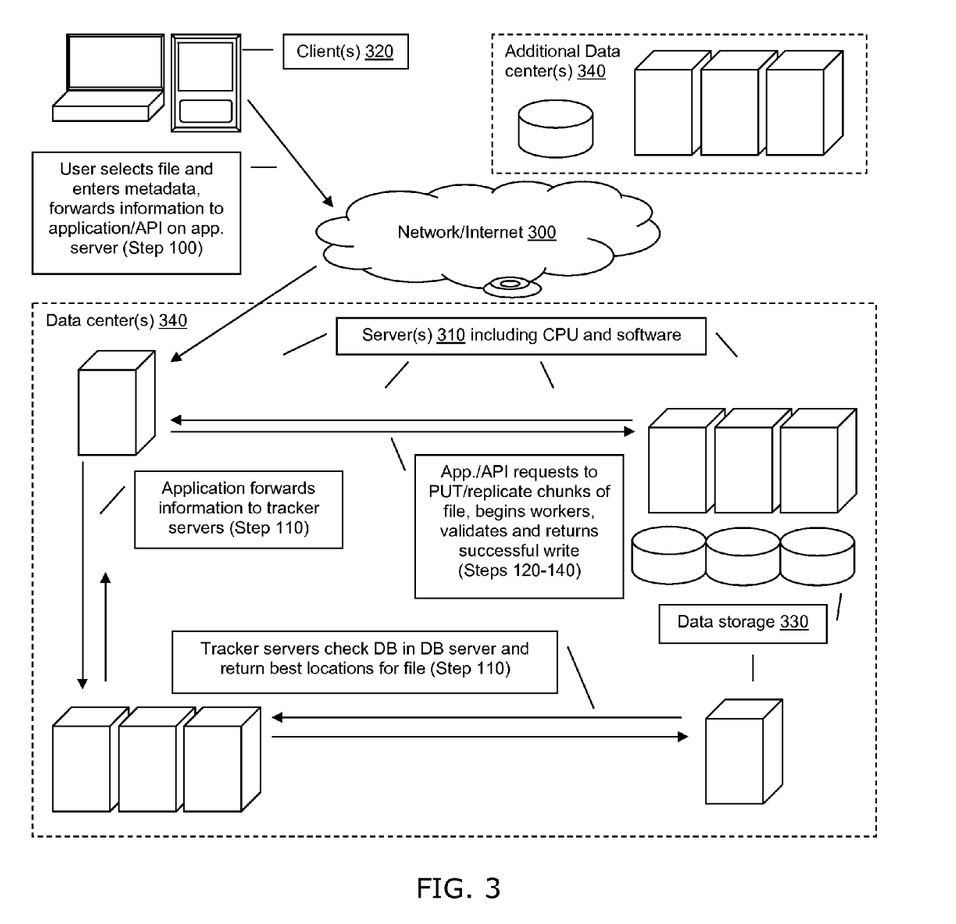
FIG. 3 illustrates a possible system for writing a file to a cloud storage solution.

In an example embodiment illustrated in FIGS. 1-3, a user of the system may select a file the user wants to write to a file storage system (possibly cloud storage) using an interface on a client communicatively coupled to a network. The user may input and include customized metadata with the file, possibly metadata about the file or the storage of the file, which may be written to a database in data storage, described below (Step 100).

As a non-limiting example, FIG. 2 shows an interface used to, as non-limiting examples, upload a file to an FTP site, an online file folder storage software, such as The Go Daddy Group's ONLINE FILE FOLDER, a video-based social media website, such as The Go Daddy Group's VIDEO.ME, etc. In this non-limiting example, the user may upload a file using a file upload dialog, combinations of checkboxes and drop-down lists, drag and drop technology to move a file from their client machine to the file system disclosed herein, etc. and may include customized metadata about the file and possibly storage location information about the file.

The interface and/or client may send the file information received from the user and metadata, possibly customized metadata, to an application, possibly an API described in detail below, used to store files in the file storage system (Step 100). The application/API may communicate information, including the file the application/API wants to write and/or the metadata, possibly customized metadata from the user, to one or more tracker servers described below. The tracker servers may check a database to locate a plurality of the best locations where the file may exist and return this information back to the application/API and/or the user interface. The file system may also write the metadata, possibly customized metadata, to the database (Step 110).

The user and/or application/API, now knowing the best locations for the file to exist and be stored, may use an HTTP request, possibly a PUT command, to store the file or chunks of the file, as described herein, at each of the plurality of optimal locations (Step 120). The file system may write the file in "chunks" to each of the plurality of locations if the file is greater than a pre-determined threshold for file size, and these chunks may be replicated according to the replication policy for the file system described herein.

As a non-limiting example, if "Video.avi," shown in FIG. 2 is 160 MB, and this file size is greater than a predetermined threshold, the file may be broken up into 16 MB chunks, and each of these chunks may be stored and replicated as necessary within the file storage system. This example embodiment should in no way limit the way the application/API divides file chunks. Such chunks can be any combination of file sizes, according to the embodiment in use. If the application fails writing the file or chunks of files to one destination midway, it can retry and write somewhere else. Once the application/API has completed writing to each of the plurality of locations, the application/API may communicate back to the tracker server, informing the tracker server that the writes were completed (Step 120). The application/API and/or client application may tell the tracker where it wrote to, possibly using a predefined method in the application/API.

The tracker server may then validate that the file writes were successful and finalize the information in the database, including that the file was written, the location of the file, any metadata and/or customized metadata, any file information disclosed herein, any other file or file storage system information or any combination thereof (Step 130).

The tracker servers may then link the file information into the domain's namespace via the database. Additional information for each file may include a key, a file class, a desired count or "desired state" for file replication according to a file replication policy described herein, a file domain, a file ID and a file namespace.

Each file may have a key comprising a unique textual string (basically any string) that identifies the file, for example/ MyFiles/MyVideos/Video.avi. Each file may be a part of a class, which specifies the desired count or desired state for file replication according to a replication policy described herein. Each file may be located in a domain and the keys for the file may be unique within domains. Just as each file may be a part of a class, each class may be a part of a domain. A domain may be a top-level separation of files and may comprise a set of classes that define the files within the domain. A file ID may be an internal numerical representation of a file, and each file may have a unique file ID. Named keys in a flat, global namespace may identify files.

After the tracker validates that the file writes were successful and finalizes the information in the database, the background processes/workers may begin, including Replication workers, MetaStore workers, CheckSum workers or any other worker processes disclosed herein (Step 140). The tracker server, in the background, may then start replicating files among the storage node servers, or elsewhere in the file storage system, until it complies with that file class's replication policy, as described herein. The tracker server may then inform the client/application that the write was successful (Step 140).

The file system may be required to make sure that a predetermined number of valid copies of a file exist before telling the end user that a file was successfully written. In one non-limiting example embodiment, additional replication policies may require that the software on a tracker server locate the two (or any number of) best locations where the file should exist within the storage node servers when writing the file, sharing this information with the application/API when the destinations are known and requiring the system to make sure that two (or any number of required) valid copies of a file exist before telling the end user that a file was successfully written.

Cloud Storage Solution for Reading and Writing Files

Several different environments may be used to accomplish the steps of embodiments disclosed herein. The systems and environments used by the present inventions may comprise a large distributed HTTP-backed data store to provide and control redundancy/replication and to provide and control file retention. These systems and environments may represent a "cloud storage" solution offering or cloud storage file system, which may be accessed online. Any part of this system or environment may be accessed to verify its contents. A possible setup for this data store may include an application front-end that has a pool of application servers that deliver the data from the applications and/or file system.

Figure 6:
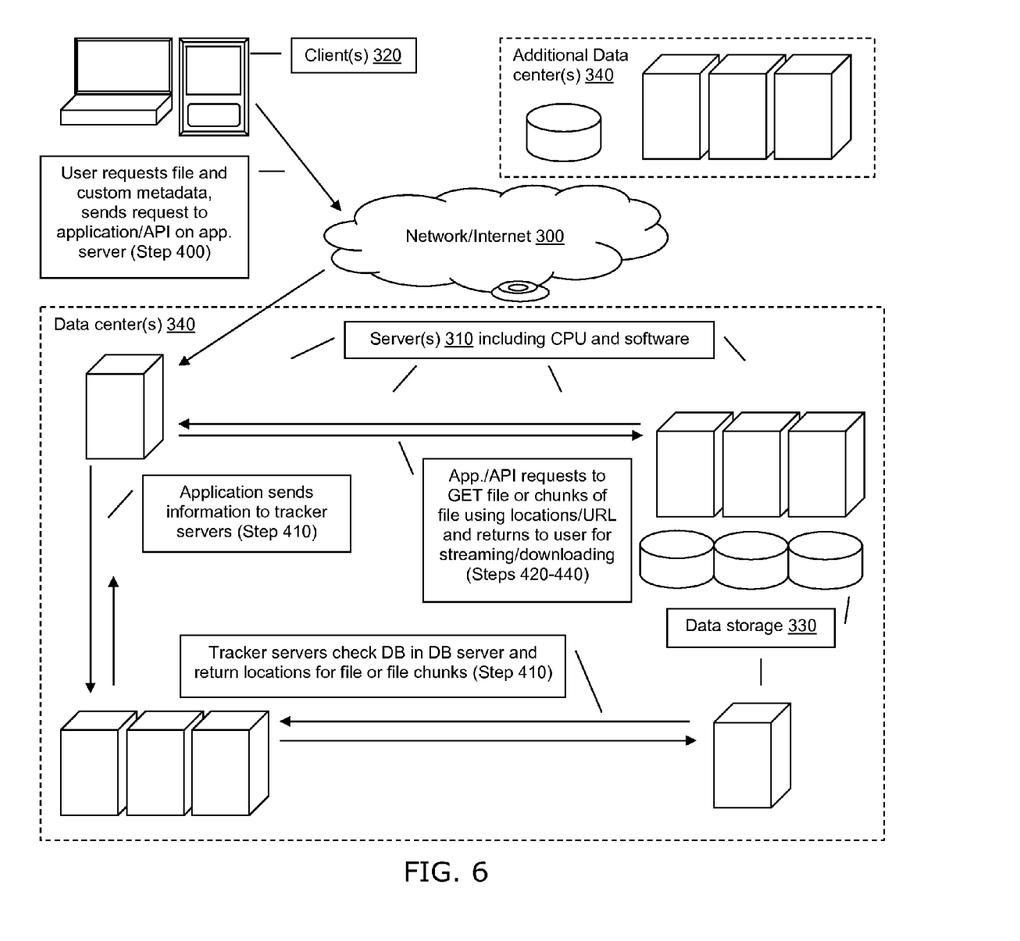
FIG. 6 illustrates a possible system for reading a file from a cloud storage solution.

FIGS. 2 and 6 demonstrate a streamlined example of such a system/environment and illustrate a non-limiting example of a system and/or structure that may be used to accomplish the methods and embodiments disclosed and described herein. Such methods may be performed by any central processing unit (CPU) in any computing system, such as a microprocessor running on at least one server 310 and/or client 320, and executing instructions stored (perhaps as scripts and/or software, possibly as software modules/components) in computer-readable media accessible to the CPU, such as a hard disk drive on a server 310 and/or client 320.

The example embodiments shown and described herein exist within the framework of a network 300 and should not limit possible network configuration or connectivity. Such a network 300 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 310 and at least one client 320 may be communicatively coupled to the network 300 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users, including the user storing the file, the API used to store the file, etc. Thus, as non-limiting examples, users may comprise any individual, entity, business, corporation, partnership, organization, governmental entity, and/or educational institution that may have occasion to store files in a cloud network environment. The files stored may comprise any collection of bits uploaded by the system to store. In other words, a file may be anything the system described herein stores for a user.

Servers 310 may comprise any computer or program that provides services to other computers, programs, or users either in the same computer or over a computer network 300. As non-limiting examples, the server(s) 310 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 320.

The server(s) 310 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The servers 310, possibly in server clusters, in the context of the current inventions may include one or more servers for the application/API described herein, one or more tracker servers to manage client communication and request operations from the application/API, one or more storage node servers to store the files and act as HTTP or other web servers used to store and serve web content, and one or more database servers comprising the one or more databases used to store information about the stored files, customized metadata, each server in the system and/or information about any other element of the system itself.

The software modules/components used in the context of the current invention may be stored in the memory of—and run on—at least one server 310 and/or client 320. As non-limiting examples of such software, the paragraphs below describe in detail the software modules/components which may comprise software and/or scripts containing instructions that, when executed by a microprocessor on a server 210 or client 220, cause the microprocessor to accomplish the purpose of the module/component as described in detail herein. The software may also share information, including data from data sources and/or variables used in various algorithms executed on the servers 310 and/or clients 320 within the system, between each module/component of the software as needed.

As a non-limiting example, the software modules/components for the file storage system application/API, may be stored in the memory of, and run on, one or more servers. This application/API may be a software application, including software modules and/or components used to store, load and/or perform other specific tasks on files.

The file storage system application may comprise/include a system API, or Application Programming Interface, an interface implemented by a software program to enable interaction with other software to perform the specific tasks outlined herein. An API may comprise a software-to-software interface that specifies the protocol defining how independent computer programs interact or communicate with each other. The API may comprise any API type known in the art or developed in the future including, but not limited to, request-style, Berkeley Sockets, Transport Layer Interface (TLI), Representational State Transfer (REST), SOAP, Remote Procedure Calls (RPC), Standard Query Language (SQL), file transfer, message delivery, and/or any combination thereof.

A base API for the system may be written in an object oriented language, thereby allowing object oriented design and ease of use. As non-limiting examples of such object oriented languages, the Application/API may be written in C++, PHP or Perl.

The API may further comprise one or more wrapper libraries, linked with the object oriented API. A wrapper library may comprise a thin layer of code, which translates a library's existing interface into a compatible interface. These libraries may give a developer or user direct access to all of the public functions in the object-oriented language used to program the API. Non-limiting examples of such wrappers may include a PHP wrapper API and/or a Perl wrapper API for a C++ API. In one non-limiting example embodiment using a Perl wrapper, Perlxs technology may be used, giving a Perl developer direct access to all of the C++ public functions, as if the developer was writing C++.

The application/API may store a large file (files whose file size exceeds a pre-determined threshold) by separating and sending the file in chunks to the file system. The file system may then handle those chunks as individual files. This means that each chunk of a file may get replicated according to replication functionality and/or replication policies described herein for purposes of "chunking," streaming and/or writing files to and reading files from the system. As a non-limiting example, the application/API may split up large files into 16 MB chunks according to its replication policy. However, this example file size should in no way limit possibly variations of file sizes or file chunking functionality.

In various embodiments, the application/API may be, but is not required to be, aware of the file size as the file is received to determine whether or not the file should be separated into chunks and/or the size of the chunks needed. The application/API may further decide the file size of the chunks based on the size of the original file. In one non-limiting example embodiment, the file chunks may be stored according to an initial or original "parent" file chunk, with several related "child" chunks, thereby allowing more efficient storage and retrieval of the complete file.

The replication policy may include a "desired state" or a desired count of replicated files for each file, possibly in a certain unique class for each file. This desired state or desired count may be a property of the class to which the file belongs, and files may be replicated according to this desired count or desired state. This desired state or desired count of replicated files may define how many times the files in that class need to be replicated onto different devices in order to provide and control redundancy/replication, to provide and control file retention, and/or to ensure redundancy among the data to prevent loss. There may also be additional replication policies defined, possibly in and/or for each class of files.

For instance, for an online social media hosting site for videos, a user may require original AVI files to have a desired state or desired replica count of 2, but thumbnails and scaled versions may only have a replica count of 1. If the user were to lose the only copy of a thumbnail, the application may just rebuild it. In this way, the file system may avoid having data storage that would otherwise be storing multiple copies of data unnecessarily.

The system may comprise software components comprising algorithms for writing files to the file storage system and reading files from the file storage system, by breaking the file into smaller chunks and writing these chunks to storage nodes or elsewhere in the file storage system according to the system's replication policy. These software components may then retrieve the file or the chunks required to retrieve the file when reading the files, possibly as a stream, from the file storage system. Writing to and reading from the system may be accomplished through an interface displayed to a user on a client, illustrated, as non-limiting examples, in FIGS. 2 and 5. This interface may then pass the file and/or metadata information (or a request for such a file or metadata information) to the application/API for processing (Step 100). This user interface, used in conjunction with the application/API may also give the user the ability to store custom meta information with and about the files stored in the file storage system.

The client 320 may be any computer or program that provides services to other computers, programs, or users either in the same computer or over a computer network 300. As non-limiting examples, the client 320 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 220. Non-limiting example programming environments for client applications may include JavaScript/AJAX (client side automation), ASP, JSP, Ruby on Rails, Python's Django, PHP, HTML pages or rich media like Flash, Flex or Silverlight.

Clients 320 that may be used to connect to the network 300 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server 310. These may be, but are not limited to being accessed by a remote desktop program and/or a web browser, as are known in the art.

The user interface displayed on the client(s) 320 or the server(s) 310 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the file storage system, or any other information, may be accepted using any field, widget and/or control used in such interfaces, including but not limited to a text-box, text field, button, hyper-link, list, drop-down list, check-box, radio button, data grid, icon, graphical image, embedded link, etc.

After receiving input from a user, the user interface on the client 320 and/or the application/API may then forward the file and/or user metadata, requests, operations and/or other information to one or more tracker servers within the system. These tracker servers may be specified event-based servers that contain a process management system to manage all communication between the one or more servers in the file storage system and the application/API. These trackers may ensure that all other servers, applications, databases and/or any other system elements/components are fully operational, thereby acting as "watchdogs" over the system. The tracker servers may comprise one or more event-based parent processes (which may communicate with one or more "child processes" described below) and/or a message bus to manage all client communication from applications requesting operations to be performed, possibly including the application/API and/or user interface on the client 320.

The tracker servers may use load-balancing techniques to increase performance for the connecting application/API. Load balancing may comprise any technique, component (such as one or more load balancers) and/or software used to spread work between a plurality of servers, computers, processes, hard disks or other resources in order to get optimal resource utilization. Load balancing may also decrease computing time and/or increase the capacity of a server cluster or "server farm" beyond that of a single server.

The tracker servers (and storage node servers, described herein) may comprise one or more "workers," also referred to as "child processes," "worker processes," "background worker processes," "job workers" and/or "query workers," comprising software components/processes which run in the background to accomplish designated tasks. These workers may comprise any configuration of software and/or hardware disclosed herein. The tracker servers (and/or storage node servers) may also handle all communication between these child processes.

The system may use any load balancing techniques and components to load balance requests from the application/API onto one or more of these worker processes. For example, two or more trackers may be run on different hosts, thereby creating a High Availability environment. The system may have a plurality of job workers per tracker, and most of these jobs may be scaled up at runtime, possibly by requesting the parent process to create more workers, which may affect processing speed. Having too many query workers may add unnecessary load to the servers 310 and database, so the system may also scale down job workers per tracker to increase processing speed. Requesting fewer workers may allow the parent process to slowly remove workers as they complete their designated tasks. The user may also stop or reset all workers by requesting zero workers in the process, waiting until they are removed by the parent process and starting them up again.

In one non-limiting example embodiment, the workers may include a special "job master" worker process, with each tracker server only having one job master worker. This worker may poll the database and consolidate fetching jobs to process from one or more system queues, such as database queues, leaving other individual workers free from such tasks. It may monitor and populate one or more internal, persistent and/or shared system queues, such as work queues for deleting, replicating, etc.

Other "child worker" processes on the tracker servers may include Query workers, Replication workers, Monitor workers, Delete workers, Process Management Validator workers, Sync workers, Reaper workers, Rebalance workers, "Reapalance" workers, or any combination thereof.

The tracker servers may include one or more Query workers, configured to answer and perform requests from the calling application/API and/or other applications/interfaces on the client 320. Query workers may be the only workers that interact and/or interface directly with the application/API and/or any other applications on the client 320. When a user/client 320 connects to the system, it may establish a connection with the parent process on a tracker server. When a request is issued, the parent process may send the request to an idle worker for processing. If there are no idle workers available, the request may be queued in a system queue for later processing. The system may monitor and display pending queries and the average number of Query workers to the user.

The tracker servers may include one or more Replication workers, which may ensure that the specified replication policy is fulfilled. As previously disclosed, files, based on their "class," may be automatically replicated between enough different storage node servers, or elsewhere in the file storage system, to satisfy the desired state or desired count of replicated files requested by their class. Replication workers may automatically check a file against the replication policy, and make more copies of the file within specific storage nodes based on the policy, possibly by dividing larger files into chunks and replicating these chunks. In addition to the Reaper, Rebalance and "Reapalance" workers described herein, the Replication workers may also handle drain and rebalance. As with other workers, additional Replication workers may be added if the user feels it takes too long to replicate files.

The tracker servers may include one or more Monitor workers, configured to monitor the health and status of hosts and devices, to ensure all files, locations of files, storage node devices, or any other components of the file storage system are reachable. The Monitor workers may verify that each copy of the file is stored where it is supposed to be, that the file exists and is the correct length. If the file is missing, indicated by no working paths, the Monitor workers may attempt to find the file on any monitored devices. The Monitor workers may constantly contact all devices and/or check the database to see which files, monitored devices and/or other system components are available and online. If a device becomes unavailable on its own, the Monitor worker may note that change to all the workers a tracker server or storage node server runs, then notify the workers of the tracker or other server's return, assuming the server recovers. The Monitor worker may be a unique process to each tracker.

The tracker servers may include one or more Delete workers, configured to trigger files for deletion based on an archiving algorithm. In other words, the Delete workers may process system queues, such as delete queues, to permanently remove deleted and/or overwritten files and/or may remove "dead" temporary files from failed uploads. As with other workers, additional Delete workers may be added if the user feels it takes too long to delete files, or if they feel database tables for tracking deletion are expanding too quickly.

The tracker servers may include one or more Process Management Validator workers, configured to validate the process management system that manages all communication from the Application/API and throughout the file management system. These Process Management Validator workers may ensure that all other worker processes are up and functioning properly, and may ensure that all other servers are operational within a given instance of the file storage system.

The tracker servers may include one or more Sync workers, configured to make sure that the entire system stays balanced. The Sync workers may accomplish this by cleaning queues of expired files, removing temporary files that failed or were stopped short of their upload and ensuring that each file that is uploaded in the system has a valid replication policy.

The tracker servers may include one or more Reaper workers, one or more Rebalance workers and/or one or more "Reapalance" workers. Any of these processes may use a system queue, such as the replication queue, to complete their task. They may ensure that the traffic in the queue does not meet a certain threshold. Before populating the replication queue, the system may calculate on the fly how many bytes are flowing through the network. If the number of bytes flowing through the network is less than a configurable threshold, additional workers/tasks may be added to the queue. If the number of bytes flowing through the network is greater than or equal to the configured threshold, then the system may wait until the queue empties.

The Reaper workers may process devices recently marked as "dead." Reaper workers may make sure that files from a dead device are copied from another valid location to fulfill the replication policy. In addition, Reaper workers may delete the location for files and file copies on the dead devices, possibly from databases in data storage 330. The Reaper workers may schedule replication in order to attempt to repair the files and/or may re-enqueue the files for replication after a disk or other device fails. The Reaper worker may be very aggressive to facilitate a speedy recovery from the loss of a device.

A Rebalance worker process may consist of draining code that acts the same as the Reaper worker above, with the distinction that the Rebalance worker and/or the tracker server that the Rebalance worker is associated with may use itself as a valid location. The Reaper worker process may also be transformed into a Reaper and Rebalance worker process, or a "Reapalance" worker process, comprising the functionality of both the Reaper and Rebalance worker processes, and including the ability to use itself as a valid location.

Storage node servers may be servers where the files are stored. The storage node servers may use any combination of servers including one or more HTTP web servers that allow for basic HTTP request functionality, such as PUT, DELETE, GET, etc. These server computers may be configured to use two or more different servers, possibly on different ports.

As a non-limiting example, the combination of one or more web servers on the storage node servers may handle any request messages from the client and/or application/API to store and/or serve web content. The web servers may be configured to handle any of the defined request methods for HTTP, including, but not limited to GET, used to request a representation of a specified resource, PUT, used to upload a representation of a specified resource, DELETE, used to delete a specified resource, etc.

In addition to severing web content, the storage node servers may run one or more file-storage-system parent processes that may have one or more additional workers of their own, to ensure the system stays running smoothly. Although specific examples of workers herein are associated with tracker servers and storage node servers respectively, any of the disclosed worker processes may be found on any server within the file storage system. In addition, the functionality of the individual workers is not limited to that disclosed.

The storage node servers may include one or more Check-Sum workers, used to perform checksums on files that are stored within the system. These checksums may detect limited and accidental modification and/or errors introduced during transmission and/or storage, such as corruption to stored data or errors in a communication channel. The integrity of the data and/or file, may be checked by re-computing the checksum and comparing it with a stored one. If the checksums do not match, the data may have been altered.

The storage node servers may include one or more DiskManagerInitializer workers, used to format and manage new disks. The storage node servers may also include one or more DiskManager workers, used to manages the health of the disk and report storage statistics of the disk. As non-limiting examples, the DiskManager worker may use information from common disk checking file system utilities and commands such as -ls to list directory contents and -df to report free disk space, possibly applying these commands on UNIX compatible machines. The DiskManager worker may also use a device file, possibly used to access specific resources on those devices, such as disk partitions and/or one or more software suites used to facilitate configuration, remote monitoring and management of high-performance computing clusters.

The storage nodes may include one or more FileBuilder, FileCount, FileDelete, IOStat, MetaStore, Sync and/or DB Restore workers. FileBuilder workers may handle requests to build files (XML). FileCount workers may count the number of files stored on every device. FileDelete workers may determine the files that should be deleted and remove them. IOStat workers may report the performance and/or status of utilized devices in a regular, possibly 30-second, interval. MetaStore workers may ensure that meta information is stored about each file on the system. Sync workers may search through the file system and validate that information about every file is located in the database by looking through ".meta" files that are stored by the MetaStore workers. DB Restore workers may restore any files needed to be restored after the Sync workers have validated all files.

The server(s) 310 and/or client(s) 320 may be communicatively coupled, possibly through the network 300, to data storage 330, which may include one or more databases of file information, server information, custom or other metadata information and/or any other information requested or required by the system. The data storage 330 may be any computer components, devices, and/or recording media that may retain digital data used for computing for some interval of time. The storage may be capable of retaining stored content for any data required, on a single machine or in a cluster of computers over the network 300, in separate memory areas of the same machine such as different hard drives, or in separate partitions within the same hard drive, such as a database partition.

Non-limiting examples of the data storage 330 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 330 may comprise any collection of data. As non-limiting examples, the data storage 330 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The servers 310 or software modules within the servers 310 may use query languages such as MSSQL or MySQL to retrieve the content from the data storage 230. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The data storage may contain a database, which may be a central component of the system. This database may store, as non-limiting examples, information about every server or other component within the system, including its location, status, etc. It may also maintain namespaces, file locations and file metadata as well. Both tracker servers and storage node servers may communicate with the database for information. In one embodiment, the system may require all trackers and storage node servers to point to the same database, to accommodate transactions and exclusive locks used to coordinate individual processes and trackers.

The database may be setup in a High Availability (HA) or Failover configuration so that there isn't a single point of failure. Redundancies in servers and software may be used to provide service when system components fail. Likewise, the system may detect hardware/software faults and immediately restart the application on another system without requiring administrative intervention.

As previously mentioned, the database may store system metadata such as the namespace, and which files are where. This and other metadata may be custom metadata accepted from the user, via the user interface on the client 320. This custom meta data may be accepted, stored in the database, retrieved as required and used by the system to more efficiently write to and read from the file system.

One or more data center(s) 340 may provide hosting services for the various servers, web servers, HTTP servers, application servers, database servers, and/or any related hosted website described herein including, but not limited to hosting one or more computers or servers in a data center 340 as well as providing the general infrastructure necessary to offer hosting services to Internet users including hardware, software, Internet web sites, hosting servers, and electronic communication means necessary to connect multiple computers and/or servers to the Internet or any other network 300. These data centers 340 or the related clients 320 may accept messages from text messages, SMS, web, mobile web, instant message, third party API projects or other third party applications.

Reading a File from a Cloud Storage Solution

Several different methods may be used to provide and manage the disclosed invention. In an example embodiment illustrated in FIGS. 4-6, one or more software components or method steps executed using the system and environment described in detail herein and executed on one or more servers 310 or clients 320, may accept a selection of one or more files to be read from the file storage system solution. The disclosed method steps may describe one non-limiting example of a happy path of getting a file from the application/API.

Figure 5:
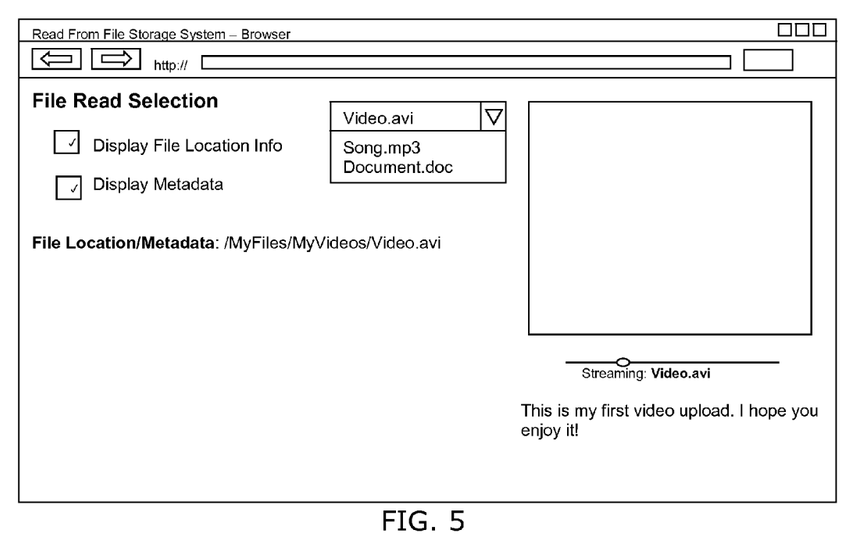
FIG. 5 illustrates a possible embodiment of an interface for reading a file from a cloud storage solution.

As a non-limiting example, FIG. 5 shows an interface on a client from which for a user to request a file from, as non-limiting examples, an FTP site, an online file folder storage software, such as The Go Daddy Group's ONLINE FILE FOLDER, a video-based social media website, such as The Go Daddy Group's VIDEO.ME, etc. In this non-limiting example, the user may request to, as non-limiting examples, download the file, stream the file, display customized metadata about the file and/or display storage information such as file location about the file.

Figure 4:
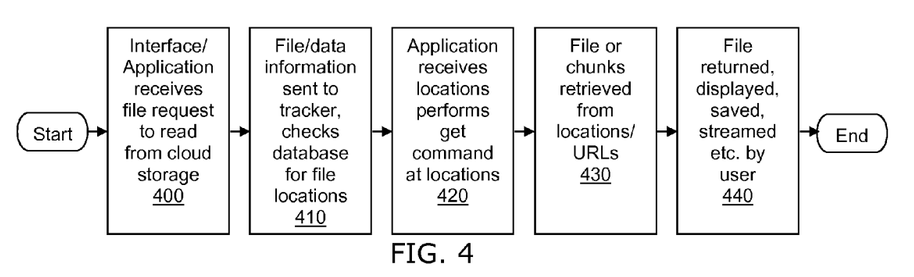
FIG. 4 is a flow diagram illustrating a possible embodiment of a method for reading a file from a cloud storage solution.

A user interface displayed on a client may receive a selection of a requested file stored and distributed, possibly in replicated chunks, among a plurality of storage node servers or elsewhere in the file storage system, possibly for streaming or download purposes (Step 400). The user may also request a plurality of file location and/or metadata information, possibly customized metadata information, stored in a database in data storage 330. The customized metadata may have been previously entered by the user to customize information about or associated with the file, system elements and/or system configurations. The user request may then be sent to an application/API (Step 400).

The application/API may communicate to the tracker what file it wants to read (Step 410). The tracker may check the database to find all of the user's requested file locations and/or any other relevant information about the path to the requested file within the storage nodes or elsewhere in the file storage system (Step 410). If the file was stored in separated chunks, due to the original file exceeding a pre-determined threshold of file size, the application/API may be required to request file locations for each of the chunks that make up the completed file.

The tracker servers may return the file locations for the user's requested file or file chunks to the application/API, which may be displayed to the user on the client 220, so that the user and/or application/API know the exact location of the file or file chunks requested (Step 420). One or more Uniform Resource Locators, or URLs, associated with the one or more file locations may be displayed to the user, as well as forwarded to the application/API.

Once the user and/or application/API knows the exact location/URL from which to fetch the requested file and/or file chunks, the application/API may perform an HTTP request, possibly a GET command, on that location and/or plurality of locations for file chunks (Step 430). The contents of the file may be retrieved, displayed, downloaded and/or streamed to the user (Step 440).

The steps included in the embodiments illustrated and described in relation to FIGS. 1-6 are not limited to the embodiment shown in FIGS. 1 and 4 and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising the steps of:
receiving, by a server computer communicatively coupled to a network, a request to store a file, a customized metadata about the file, a stored checksum associated with the file and at least one file copy on the server computer;
populating, by the server computer, at least one system queue on the server computer with at least one system task to write the file, the customized metadata, the stored checksum and the at least one file copy to the server computer;
generating at runtime, by the server computer:
at least one query worker module configured to load balance the at least one system task; and
at least one checksum worker module configured to:
identify a modification to the file;
generate, from the file, a checksum;
determine whether the checksum matches the stored checksum; and
responsive to a determination that the checksum does not match the stored checksum:
remove the file from the server computer; and
generate an additional file copy from the at least one file copy; and
responsive to a completion of the at least one system task, deleting, by the sever computer, the at least one query worker module and the at least one checksum worker module.

2. The method of claim 1, wherein the stored checksum comprises a plurality of checksum data and is stored within:
a database communicatively coupled to the network; or
a metadata file stored on the at least one server computer and associated with the file via a file identification.

3. The method of claim 2, wherein the plurality of checksum data in the database is compared with a second plurality of checksum data generated in the checksum.

4. The method of claim 1, wherein generating the at least one query worker module and the at least one checksum worker module further comprises the steps of:
queuing, by the server computer, into a checksum server process queue on the server computer, at least one checksum server process associated with the file; and
executing, by the server computer, the at least one checksum server process.

5. The method of claim 1, further comprising the steps of:
storing, by the server computer:
a metadata file associated with the file and comprising a file identification; and
a metadata:
stored in a database communicatively coupled to the network;
associated with the file; and
comprising a corresponding file identification;
determining, by the server computer, whether the file identification and the corresponding file identification comprise asynchronous data; and
responsive to a determination that the file identification and the corresponding file identification comprise asynchronous data:

removing, by the server computer, the file from the server computer; and generating, by the server computer, a second copy of the file from the at least one file copy.

6. The method of claim 5, wherein the metadata file and the metadata stored in the database comprise:

a full path to the file; and a REST layer to search the database for a data within the full path.

7. The method of claim 1, further comprising the steps of: storing, by the server computer:

a metadata file:
associated with the file via a file identification; and
comprising a file data about the file; and a metadata:
stored in a database communicatively coupled to the network;
associated with the file via the file identification; and
comprising a corresponding file data about the file;

identifying, by the server computer, an asynchronous data between the file data and the corresponding file data;

identifying, by the server computer, the file data within the metadata file as a master data; and replacing, by the server computer, the asynchronous data in the database with the master data from the metadata file.

8. The method of claim 1, further comprising the steps of:

storing, by the server computer, at least one replication policy for replicating at least one file stored on the server computer;

receiving, by the server computer, the file to be stored on the server computer;

replicating, by the server computer, the at least one file copy according to the at least one replication policy;

determining, by the server computer, whether the server computer is actively replicating the at least one file according to the at least one replication policy; and responsive to a determination that the server computer is not actively replicating the at least one file according to the at least one replication policy, automatically replicating, by the server computer, the at least one the copy to fulfill the at least one replication policy.

9. The method of claim 8, wherein replicating the at least one file copy is accomplished using at least one replication server process running on the server computer.

10. The method of claim 8, wherein populating the at least one system queue further comprises the steps of:

storing, by the server computer, a file division size;

receiving, by the server computer, the file via a data stream, wherein the file comprises an unknown file size;

determining, by the server computer, whether the data stream for the file is equal to the file division size; and responsive to a determination that the data stream for the file is equal to the electronic file division size, storing, by the server computer, a split file of the file division size comprising the data stream of the file.

11. A method, comprising the steps of:

receiving, by a server computer communicatively coupled to a network a request to store a file, a customized metadata about the file and a threshold value for a server usage metric on the server computer;

populating, by the server computer, at least one system queue on the server computer with at least one system task to write the file, the customized metadata and the threshold value to the server computer;

generating at runtime, by the server computer, at least one query worker module configured to load balance the at least one system task by:

monitoring the server usage metric for a first server computer and a second server computer;

determining whether the server usage metric for the first server computer exceeds the threshold value;

responsive to a determination that the server usage metric for the first server computer exceeds the threshold value, generating, at runtime, at least one rebalance worker module configured to:

determine whether the server usage metric for the second server computer exceeds the threshold value; and responsive to a determination that the server usage metric for the second server computer does not exceed the threshold value, run, on the second server computer, a server process to change the server usage metric; and responsive to a completion of the at least one system task, deleting, by the server computer, the at least one query worker module and the at least one rebalance worker module.

12. The method of claim 11 wherein the server usage metric comprises a usage load on the first server computer and the second server computer.

13. The method of claim 12 wherein the server process comprises one of a plurality of requested idle server processes within a server process queue tasked with load balancing the usage load.

14. The method of claim 13 wherein the server process is added to the server process queue on the second server computer responsive to the usage load on the first server computer being greater than the usage load on the second server computer.

15. The method of claim 14 wherein at least one additional server process is added to the server process queue on the second server computer if the server usage metric for the second server computer does not exceed the threshold value.

16. The method of claim 11 wherein the server usage metric comprises:

a network traffic metric comprising a total bandwidth used on the network;

a disk storage usage metric comprising a percentage of disk space available on the first server computer or the second server computer;

a server process thread metric comprising a total of all server process threads on the first server computer or the second server computer; or a server process queue metric comprising a total of all server processes in a server process queue of the first server computer or the second server computer.

17. The method of claim 11 wherein the server process comprises:

writing a file to the first server computer; and replicating the file on the first server computer.

18. The method of claim 17 wherein the server process of writing the file to the first server computer takes precedence over any other server process in a server process queue.

19. The method of claim 11, wherein responsive to a determination that the server usage metric for the second server computer exceeds the threshold value:

deferring, by the server computer, the server process until at least one server process in a server process queue is removed; or removing, by the server computer, from the server process queue, the at least one server process.

20. The method of claim 11, wherein the server process comprises:

identifying a network device that is no longer accessible through the network;

deleting, from a database communicatively coupled to the network, a location of at least one file stored on the network device; and replicating, according to a replication policy on the network device, a copy of the at least one file from a second network device accessible through the network.

* * * * *